United States Patent
Howes et al.

(10) Patent No.: US 9,709,347 B2
(45) Date of Patent: Jul. 18, 2017

(54) THERMAL STORAGE SYSTEM

(75) Inventors: Jonathan Sebastian Howes, Hampshire (GB); James Macnaghten, Hampshire (GB); Rowland Geoffrey Hunt, Hampshire (GB)

(73) Assignee: Energy Technologies Institute LLP, Loughborough (GB)

( * ) Notice: Subject to any disclaimer, the term of this patent is extended or adjusted under 35 U.S.C. 154(b) by 157 days.

(21) Appl. No.: 14/006,621

(22) PCT Filed: Aug. 24, 2011

(86) PCT No.: PCT/GB2011/051596
§ 371 (c)(1),
(2), (4) Date: Sep. 20, 2013

(87) PCT Pub. No.: WO2012/127179
PCT Pub. Date: Sep. 27, 2012

(65) Prior Publication Data
US 2014/0008033 A1     Jan. 9, 2014

(30) Foreign Application Priority Data
Mar. 23, 2011   (GB) .................................. 1104867.5

(51) Int. Cl.
*F28F 13/06*     (2006.01)
*F24J 2/34*      (2006.01)
(Continued)

(52) U.S. Cl.
CPC ............. *F28F 13/06* (2013.01); *F28D 19/00* (2013.01); *F28D 20/0056* (2013.01); *F24J 2/34* (2013.01);
(Continued)

(58) Field of Classification Search
CPC .......... F28D 17/00; F28D 17/02; F28D 19/00; F28D 20/0056; F28D 2020/0013; F28D 2020/0069; F28D 2020/0082; F24J 2/34
(Continued)

(56) References Cited

U.S. PATENT DOCUMENTS 4,124,061 A    11/1978  Mitchell et al.
4,190,099 A *   2/1980  Despois et al. ............... 165/45
(Continued)

FOREIGN PATENT DOCUMENTS

AT           118225        6/1930
CN        201110594 Y     9/2008
(Continued)

OTHER PUBLICATIONS

D.M. Crandall et al., "Segmented Thermal Storage", 2004, pp. 435-440, Solar Energy 77.
(Continued)

*Primary Examiner* — Justin Jonaitis
*Assistant Examiner* — Joel Attey
(74) *Attorney, Agent, or Firm* — Lempia Summerfield Katz LLC

(57) ABSTRACT

A heat storage system (400) comprising a system gas inlet (460), a system gas outlet (470), and at least two thermal stores (401, 402) connected together in series therebetween, wherein each store comprises a chamber having a gas inlet (461,462), a gas outlet (471,472), and a gas-permeable thermal storage media 431 disposed therebetween, the system further comprising flow controllers (451, 452, 453, 454, 457) operatively connected to bypass passageways and so configured that, during operation, the flow path of a gas flowing through the system (400) for transfer of thermal energy to or from the storage media (431) can be selectively
(Continued)

altered in respect of which stores (401, 402) in the series are used in response to the progress of the thermal transfer.

16 Claims, 6 Drawing Sheets

(51) Int. Cl.
*F28D 20/00* (2006.01)
*F28D 17/00* (2006.01)
*F28D 19/00* (2006.01)
*F28F 9/22* (2006.01)

(52) U.S. Cl.
CPC ........ *F28D 17/00* (2013.01); *F28D 2020/006* (2013.01); *F28D 2020/0013* (2013.01); *F28D 2020/0026* (2013.01); *F28D 2020/0069* (2013.01); *F28D 2020/0082* (2013.01); *F28F 2009/226* (2013.01); *Y02E 60/142* (2013.01)

(58) Field of Classification Search
USPC ......... 165/7, 10, 103, 297, 298, 902; 60/659
See application file for complete search history.

(56) References Cited

U.S. PATENT DOCUMENTS

| | | | |
|---|---|---|---|
| 4,215,553 | A | 8/1980 | Poirier et al. |
| 4,283,914 | A * | 8/1981 | Allen .................. 60/641.14 |
| 4,291,750 | A * | 9/1981 | Clyne et al. .................. 165/294 |
| 4,405,010 | A | 9/1983 | Schwartz |
| 4,524,756 | A | 6/1985 | Laverman |
| 4,607,424 | A * | 8/1986 | Johnson .................. B23P 15/26 165/4 |
| 5,615,738 | A | 4/1997 | Cameron et al. |
| 8,554,377 | B2 | 10/2013 | Mathur et al. |
| 2006/0201163 | A1* | 9/2006 | Haefner et al. .................. 62/6 |
| 2008/0066736 | A1 | 3/2008 | Zhu |
| 2008/0210218 | A1 | 9/2008 | Hanel |
| 2009/0020264 | A1 | 1/2009 | Morita et al. |
| 2010/0176602 | A1* | 7/2010 | Shinnar .................. F03G 6/04 290/1 A |
| 2010/0230075 | A1 | 9/2010 | Mathur et al. |
| 2012/0018116 | A1 | 1/2012 | Mathur et al. |
| 2012/0279679 | A1 | 11/2012 | Soukhojak et al. |

FOREIGN PATENT DOCUMENTS

| | | |
|---|---|---|
| DE | 447615 | 7/1927 |
| DE | 2419778 | 9/1975 |
| DE | 10005937 A1 | 8/2001 |
| EP | 1857614 B1 | 3/2010 |
| FR | 550938 | 3/1923 |
| JP | 56053392 | 5/1981 |
| JP | 61-262592 A | 11/1986 |
| JP | 4-272458 A | 9/1992 |
| JP | 6-185411 A | 7/1994 |
| JP | 7-98189 A | 4/1995 |
| JP | 2002-39694 A | 2/2002 |
| JP | 2003-166752 A | 6/2003 |
| JP | 2009-299920 A | 12/2009 |
| WO | 9005271 | 5/1990 |
| WO | 2009044139 A2 | 4/2009 |
| WO | 2009082713 A1 | 7/2009 |
| WO | 2009103106 A2 | 8/2009 |
| WO | 2010060524 A1 | 6/2010 |
| WO | 2011104556 A2 | 9/2011 |
| WO | 2012020233 A2 | 2/2012 |
| WO | 2012020234 A2 | 2/2012 |
| WO | 2012150969 A1 | 11/2012 |
| WO | 2013015834 A1 | 1/2013 |

OTHER PUBLICATIONS

International Search Report and Written Opinion in International Application No. PCT/GB2011/051596, Jan. 26, 2012, 11 pages.
International Search Report and Written Opinion in International Patent Application No. PCT/GB2011/051595, Mar. 20, 2012, 12 pages.
Third Party Observation in International Patent Application No. PCT/GB2011/051595, Jul. 4, 2013, 2 pages.
Third Party Observation in International Patent Application No. PCT/GB2011/051596, Jul. 4, 2013, 2 pages.
Non-Final Office Action in co-pending U.S. Appl. No. 14/006,635, dated Nov. 17, 2016, 18 pages.

* cited by examiner

THERMAL STORAGE SYSTEM

RELATED APPLICATION DATA

This U.S. national phase application is based on international application no. PCT/GB2011/051596, filed on Aug. 24, 2011, which claimed priority to British national patent application no. 1104867.5, filed on Mar. 23, 2011. Priority benefit of these earlier filed applications is hereby claimed.

The present invention relates to a system for storing thermal energy, and a method of operating the same. The system may form part of a system for receiving and returning energy in the form of electricity (hereinafter referred to as "electricity storage" apparatus).

A number of systems have been proposed for electricity storage that store the heat of compression of air and absorb the work of expansion of air.

A commonly proposed example of this is called Adiabatic CAES where a salt cavern is typically used as a compressed air store. When electricity is to be stored a motor drives a compressor to compress air into the cavern. The compression process raises the temperature of the air and to allow efficient energy recovery it is necessary to store this 'heat of compression' in some form of thermal store.

The cavern will normally be kept at a minimum pressure, such as 40 bar, and this is increased to a higher limit, for example 60 bar, during charging. These pressures are likely to generate a peak temperature, using air, in the region of 650 degrees C. This is normally either transferred to an unpressured thermal store by a heat exchanger or stored directly in a thermal storage matrix contained within a pressurised vessel. To recover the electricity the process is reversed and the compressed gas is reheated by the thermal store prior to expansion. The work of expansion is used to drive a generator to generate electricity.

The aim is to store the heat with only a small difference between the compressed air temperature and the storage material temperature, such that when the process is reversed the air is heated to near its original temperature.

As mentioned, one option is to use a heat exchanger rather than a thermal storage matrix within a pressurised vessel. However, this sort of heat exchange is extremely difficult to achieve because there are no heat transfer liquids that operate in the range 0-650 degrees C. This means that either multiple liquids must be used or the heat exchange is via a gas, which means a gas to gas heat exchanger. Multiple heat transfer liquids are difficult to manage, require multiple storage vessels and are generally expensive, but they can operate efficiently and avoid the cost of heavily pressurised vessels.

With gas to gas heat exchangers the temperature range requires the use of quality steels and the gas flows require very large heat exchangers to avoid pressure drop. The result of this is that these heat exchangers are normally both very expensive and not very efficient, with a large temperature difference, such as 50 degrees C., after each heat transfer process.

The most efficient solution is to use a thermal storage matrix, such as a particulate structure, contained within an insulated pressure vessel and to transfer the heat to and from the gas in a manner that is similar to a very large regenerator. This has the best heat transfer, but the storage mass must all be contained within the pressure vessel, which is very expensive.

Heat transfer within a packed bed or porous media is normally a function of surface area. The higher the surface area the better the heat exchange. If smaller particles or channels or pores are used then the surface area tends to increase per unit volume of storage material—it is said to have a higher 'specific surface'. For example:—

Packed bed spheres 10 mm diameter (cubic packing) approx 314 $m^2/m^3$

Packed bed spheres 1 mm diameter (cubic packing) approx 3140 $m^2/m^3$

Porous metal foam 5 pores per inch (12% density) approx 430 $m^2/m^3$

Porous metal foam 40 pores per inch (12% density) approx 2100 $m^2/m^3$

This shows that packed spheres with 1 mm particle size have a specific surface of approximately 3140 $m^2$ or surface area in each cubic meter. For the porous foam metal with 40 pores per inch there is a specific surface of 2100 $m^2$ of surface area in each cubic meter. The density of the foam metal is 12% of the solid, which means that it has a void fraction of 88%. The void fraction of the spheres in this example is approximately only 50% by way of comparison.

There is a further advantage of a higher specific surface. Without a temperature difference between two objects there can be no heat exchange. This temperature difference must lead to irreversible thermal mixing which has no impact on the total quantity of heat stored, but does reduce the temperature at which it is stored. This in turn reduces the amount of energy that can be recovered from the stored heat as the quality of the heat has been degraded. This degradation should be distinguished from a simple loss of heat to the environment through the insulated walls of the store.

This degradation is created because there must be a temperature difference between the gas and the particle in the store, so the particles are always slightly cooler than the gas when being charged (in a hot store). When the system is discharged and the gas is blown back in the reverse direction the gas must now be cooler than the particle and hence the gas comes back out of the thermal store at a lower temperature, if it is a hot storage vessel and at a higher temperature if it is a cold storage vessel. This degradation can be regarded as the result of certain irreversible processes and these have a loss associated with them, which in an energy storage scheme results in a reduction of the amount of electricity recovered. These 'irreversible' thermal losses can be reduced by reducing the particle size, but this increases gas pressure losses through the stores.

In a heat storage situation, a 'thermal front' is created in the storage vessel, i.e. a rise or a fall in temperature in the storage media and/or the gas with distance moved downstream, which occurs in the region of the store where thermal transfer is most active. FIG. 3 illustrates the formation of a thermal front in a thermal store and shows how the process of charging a thermal store sets up a thermal front within a region of the store that progresses downstream and that is usually initially quite steep but which becomes progressively shallower as charging continues. Thus, the front starts with length $L_1$, but as it moves down the vessel it extends in length to length $L_2$ and then $L_3$. As the front will usually be asymptotic, the length of the front can be discussed in terms of the length of the front between $T_{H2}$ and $T_{A2}$, these being within 3% of the peak temperature and start temperature. If different criteria are set i.e. within 2% of the peak and start temperatures, then the nominated front lengths will be slightly longer.

For a certain store geometry a longer front will give lower thermal losses, but the length of the front will also reduce the useable amount of the store i.e. it will reduce the store utilization. If a store is 5 m in diameter and 10 m long and the thermal front is 5 m of this length, then the store utilization is reduced to approximately 50%.

If the same sized store was used and the particle size was reduced, then the same level of thermal losses could be achieved with a much shorter front. So a smaller particle size in a packed bed or pore size in a porous media will tend to give better heat transfer, lower thermal losses and better store utilization (a shorter thermal front). The one disadvantage is that there is a pressure drop associated with the fluid flow through the bed and this pressure drop increases significantly as the particle or pore size reduces.

The resistance to fluid flow increases with a decrease in the particle size and gives rise to a pressure drop in the fluid ($\delta P$). Pressure is not a vector quantity, but a pressure gradient may be defined with respect to distance. In the case of a thermal store there is a certain pressure drop $\delta P$ over a store of length L, which in this case means the pressure gradient is $\delta P/L$. The pressure decreases in the direction of the fluid velocity so the gas pressure will be lower after the gas has passed through the store. This pressure drop is also the reason why the particle size in packed beds is not reduced to a very small size that will give much higher thermal reversibility. The losses from the pressure drop outweigh the benefits of the smaller particle size.

Accordingly, the present applicant has appreciated the need for an improved thermal storage system which overcomes, or at least alleviates, some of the problems associated with the prior art.

The present invention provides a heat storage system comprising a system gas inlet, a system gas outlet, and at least two thermal stores connected together in series therebetween, wherein each store comprises a chamber having a gas inlet, a gas outlet, and a gas-permeable thermal storage media disposed therebetween, the system further comprising flow controllers operatively connected to bypass passageways and so configured that, during operation, the flow path of a gas flowing through the system for transfer of thermal energy to or from the storage media can be selectively altered with time in respect of which stores it passes through in response to the progress of the thermal transfer.

As the gas flows through the storage media in order for thermal transfer to occur, there is a pressure drop associated with this constrained flow. In very large thermal stores, this can be a considerable pressure drop. By partitioning the total storage capacity into separate stores and by enabling the gas flow path to be altered with time as thermal transfer proceeds, for example, by minimising gas flow through inactive thermal stores e.g. stores where thermal transfer is substantially complete, and/or stores where minimal thermal transfer is occurring, it is possible to minimise this pressure drop. The gas flow path may be arranged to bypass such inactive stores, for example, by means of alternative routes through the stores.

"Connected together in series" means each store outlet is connected to the inlet of the next store in the series, so that gas subjected to thermal transfer in one vessel can then be transferred into, and subjected to thermal transfer, in the next vessel, sequentially. Such a connection allows a thermal front to be transferred substantially intact between the one vessel and the next vessel; for example, the thermal front can remain for a period of time spread over two stores in the series, before finally moving out of the upstream store i.e. when the upstream store is fully charged.

Three, four, five or more thermal stores may be connected in series, depending on the heat storage capacity required. In one embodiment, the system is configured so that the gas flow path is altered with time so that is passes through those stores which contain a region of storage media where a significant amount of active thermal transfer is occurring (e.g. a significant temperature gradient exists). The gas flow path may be altered commensurate with the natural progression of a monitored thermal front and this may be monitored with sensors. Where thermal transfer is active in only one store, all the other stores upstream and downstream may be excluded from the gas flowpath. If, however, the thermal front extends over two adjacent stores, the gas flow path can be confined to those two stores and hence the gas flow path may be altered to direct it only through those stores where thermal transfer is active. The gas flow path may therefore extend over multiple stores.

In one embodiment, all the thermal stores in a system are connected together in series. In one embodiment the system is configured so that each and every store can be individually isolated from the gas flow path (i.e. bypassed).

Flow controllers for altering the gas flow path may divert the gas flow into bypass passageways so that one or more thermal stores is excluded from the gas flow path during the progress of the thermal transfer. Flow controllers may be located at store inlets and/or outlets and/or inbetween the respective thermal stores and may comprise two-way, three-way (or more) valves. For example, flow controllers may be interposed between a store outlet and the next store inlet to allow or prevent gas flow through the connection.

The thermal stores will usually each be an upright vessel arranged for vertical gas flow therethrough so that a thermal front progresses upwards or downwards through the store(s), and is not affected by convection (i.e. so that the hottest gas flow always enters or leaves from the top of the store).

In the heat storage system, at least one store outlet in the series may be selectively connectable either to the system outlet or to the inlet of another one or more stores in the series; each store outlet in the series, apart from the last one in the series, may be selectively connectable either to the system outlet or to the inlet of the next one or more stores in the series.

In the system, at least one store inlet in the series may be selectively connectable to the inlet of one or more stores in the series; each store inlet in the series, apart from the last in the series, may be selectively connectable to the inlet of the nextstore in the series.

In one embodiment, the system is configured such that, in operation, the gas flow is capable of being directed (or moved on) to the next store in the series dependent upon the progress of the leading edge of a thermal front. The system may be configured so that the gas flow path keeps being altered so as to bypass all stores in the series downstream of the store containing the leading edge.

In one embodiment, the system is configured such that, in operation, the gas flow is capable of being stopped from passing through a store dependent upon the progress of the trailing edge of a thermal front. The system may be configured so that the gas flow path keeps being altered so as to bypass all stores in the series upstream of the store containing the leading edge.

Redirection of the gas flow path with respect to the leading edge and the trailing edge is preferably conducted independent of one another. This means that the multiple store system can also adapt to thermal fronts which alter their lengths with time, which is quite common as the thermal transfer progresses.

A heat storage system with separate stores connected in series has the benefit that stores of different types (for example, two different types or three different types) may easily be incorporated into the series. Stores may therefore be included that have different individual tailored storage characteristics and the system may include a number of different pre-programmed control sequences which involve the use of only certain stores in the series (the gas flow path being controlled to bypass unwanted stores). For example, the stores may be of different sizes (width or height), have different types of storage media (e.g. different porosity or particle size or material type) or the stores may be internally partitioned differently.

In one embodiment, the two or more thermal stores are only connected for their use in series.

In one embodiment, the two or more thermal stores are connected both in series and also, in parallel. While it is essential that the stores are connected in series, the bypass passageways may be so arranged that the thermal stores are also connected in parallel. This has a number of advantages. It is a simple and efficient arrangement for respectively connecting the respective store inlets to the system inlet, and the respective store outlets to the system outlet. A parallel arrangement also allows the system to respond flexibly to demand, allowing the system to operate with either series flow, or parallel flow, or a mixture of both. During a charging phase, for example, a store may be charged in series with a set of three stores themselves charging in parallel, i.e. one store could feed into three stores, or vice versa on discharge. The combined series and parallel connectivity also enables stores to be charged out of sequence, or certain stores to be selected for use due to their unique characteristics. A system with stores connected both in series and in parallel may therefore usefully have respective stores with different storage media characteristics, as mentioned above (for example, there may be at least two stores in this system with different storage characteristics).

In one embodiment, all the stores in the system are connected both in series and in parallel.

The system layout may be symmetrical as regards the arrangement of stores and bypass passageways with respect to charging and discharging (where flow reverses).

The use of multiple stores that can be bypassed according to the invention, rather than one simple store, becomes increasingly advantageous as storage media particle size decreases. In one embodiment, the gas-permeable thermal storage media in at least one store in the series is particulate with a mean particle size of 20 mm or less.

The heat storage system may further comprise a control system for selectively altering the gas flow path. This may include sensors at the inlets and/or outlets of each store or of the system itself. However, active control by a control system may not be necessary, for example, where the manner of operation is well understood and/or predictable.

The present invention further provides a thermal energy storage system comprising at least two thermal stores connected together in series, wherein each store comprises a chamber having a gas inlet, a gas outlet, and a gas-permeable thermal storage media disposed therebetween, the system being configured such that, during operation, the flow path of a gas flowing through the system for transfer of thermal energy to or from the storage media can be selectively altered in respect of how the stores are used as thermal transfer progresses.

The heat storage system may form part of an electricity storage system, for example, a pumped heat electricity storage system or compressed air energy storage system.

There is further provided a method of operating a heat storage system comprising a system gas inlet, a system gas outlet, and at least two thermal stores connected together in series therebetween, wherein each store comprises a chamber having a gas inlet, a gas outlet, and a gas-permeable thermal storage media disposed therebetween, the system further comprising flow controllers operatively connected to bypass passageways, wherein gas is caused to flow through the system for transfer of thermal energy to or from the storage media, and the gas flow path is selectively altered in respect of which stores in the series are used in response to the progress of the thermal transfer.

In the method the heat storage system may be as specified above.

Where the two or more stores are connected both in series and in parallel, during the course of a charging phase, or during the course of a discharging phase, the stores may be used in series and in parallel. For example, in one embodiment one thermal front is split and used to create multiple thermal fronts. In one embodiment, multiple thermal fronts are merged to create one thermal front.

Figure 1:
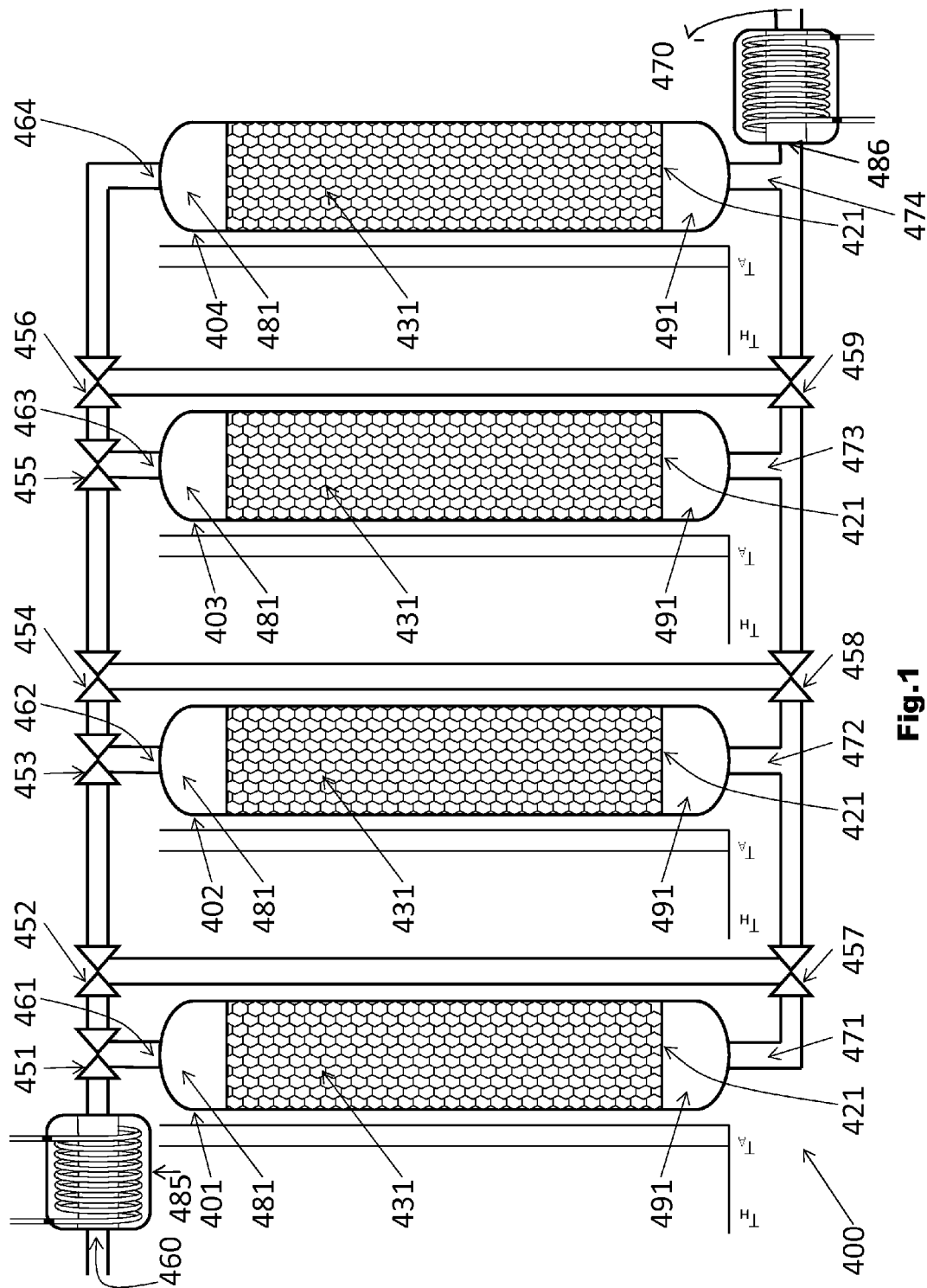
FIG. 1 is a schematic sectional view of a thermal storage system comprising multiple stores according to the present invention.

Referring to FIG. 1, this shows an improved heat storage system 400 in accordance with the invention. The system consists of thermal storage vessels or stores 401, 402, 403 and 404, thermal media support structure 421, thermal media 431 (where the thermal media is made up of a porous or particulate solid) and selective valves 451, 452, 453, 454, 455, 456, 457, 458 and 459 that are designed for only a small pressure load as their role is to divert gas flows through different storage vessels. There are gas inlet/outlets 460, 461, 462, 463, 464, 470, 471, 472, 473 and 474. There are plenums 481 and 491 in the gap above and below the thermal media in each storage vessel. Heat exchangers 485 and 486 may be used selectively to heat or cool the gas to one or more datum temperatures. The datum may be near ambient and insulation would normally be used in all areas where heat loss or gain might be a concern.

This configuration (where the media is divided into separate stores in series that are capable of being bypassed) allows individual stores to be designed with a much higher specific surface for the storage media than would be possible if the stores were combined to create one simple large store. In the simple large store, the pressure losses would be very high with an equivalent specific surface(since the gas is unable to bypass any of the storage media) and the system efficiency would drop when used as part of an electricity storage system. The pressure loss would normally be reduced by reducing the specific surface (if particles were being used this would lead to larger particles), but this leads to a reduction in the system efficiency as the heat transfer is less efficient, which can only be counteracted by increasing the length of the thermal front. A longer thermal front reduces the useable amount of storage material or increases the storage size (for the same amount of stored energy). The additional storage media required for the longer front also generates additional pressure losses. Consequently the proposed embodiment will generate smaller more efficient stores, particularly when used as part of an electricity storage system.

The storage media may comprise any material suitable for thermal exchange at the temperatures and pressures contemplated in the thermal store. The media may be a monolithic porous structure provided with an interconnecting internal network of passageways/pores, or it may be a packed bed of particulate material, including fibres, particles or other usually solid material packed so that it is gas permeable. In the case of particulate material, the smaller and more densely packed the material, the greater the potential for pressure drops, and hence, the more desirable the use of flow regulation. Particle sizes of 20 mm or less, or 10 mm or less, or even 7 mm or less may be used in such stores.

In this example the heat exchanger 486 is used to remove small levels of waste heat from the system. Heat exchanger 485 is not required in this situation. However, if this system was being used to store 'cold' then heat exchanger 486 would not be required and heat exchanger 485 would be used instead.

The stores can be used either to store heat or 'cold'. Operation of the system and its respective stores will now be described with reference to FIGS. 2a to 2i, in which the heat exchangers and reference numerals have been omitted for simplicity.

In FIG. 1, the system is shown where the first store is in a fully discharged state that might be found at first use. This is shown in the graph to the left of each store, which represents the temperature distribution of the gas through the store and it can be seen that the whole store is at $T_A$ (ambient temperature). At rest the temperature distribution of the gas will equal that of the solid, although as previously mentioned this will vary in operation depending upon gas flows and particle size.

Figure 2A:
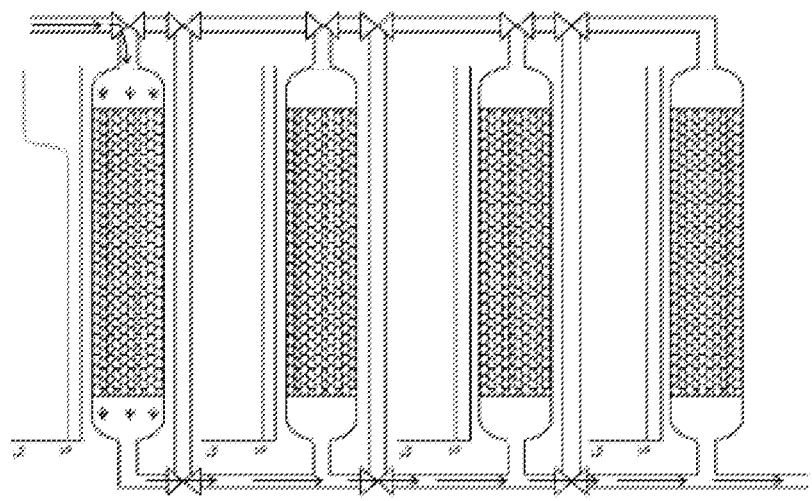
FIGS. 2a to 2i illustrate the operation of the thermal storage system of FIG. 1 during charging and discharging; and, FIG. 3 illustrates the formation of a thermal front in a thermal store; and, FIG. 4 is a schematic view of an electricity storage system incorporating two heat storage systems according to the invention.

FIG. 2a shows the system starting to charge—hot gas flows in via system inlet/outlet 460 and is ducted by valve 451 into the inlet 461 of storage vessel 401, where the gas flow then enters the thermal media 431. As the gas passes through the thermal media it is cooled and it passes its heat to the thermal media 431. The graph shows that a temperature distribution has been created within the thermal media. As this process continues the thermal front moves down the store. As has been mentioned previously, the length of this front is dependent upon a number of different factors. In the operative mode illustrated in this example, the front is never in more than two stores at once, but a longer front might extend over multiple stores for other applications.

It should be noted that there are actually two thermal fronts, one in the solid thermal media and one in the gas. This is caused by a difference in temperature between the gas and the solid thermal media 431, which depends upon a number of factors such as flow rate and the size of each element in the thermal media 431. If the thermal media is made of very small particles, such as sand then the temperature difference between the gas and solid is very low. If the thermal media is larger, say gravel, then for the same flow rate the temperature difference will also be greater and there will be a separation between the gas thermal front and the solid thermal front. The solid thermal front will always lag the gas thermal front when charging a hot store.

Because of this slight difference in temperature a store will never quite reach the temperature of the gas entering the store. Consequently a decision will be made when it is 'fully charged' that may vary for different stores and operational uses.

Figure 2B:
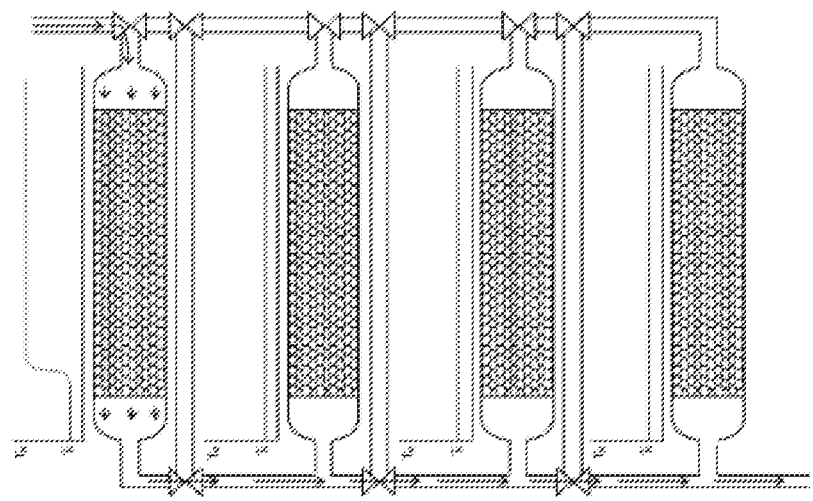

The gas exits the system via inlet/outlet 471 and then out of the system via system inlet/outlet 470, where any minor heating of the gas may be removed by heat exchanger 486. FIG. 2b shows the front near the end of storage vessel 401.

Figure 2C:
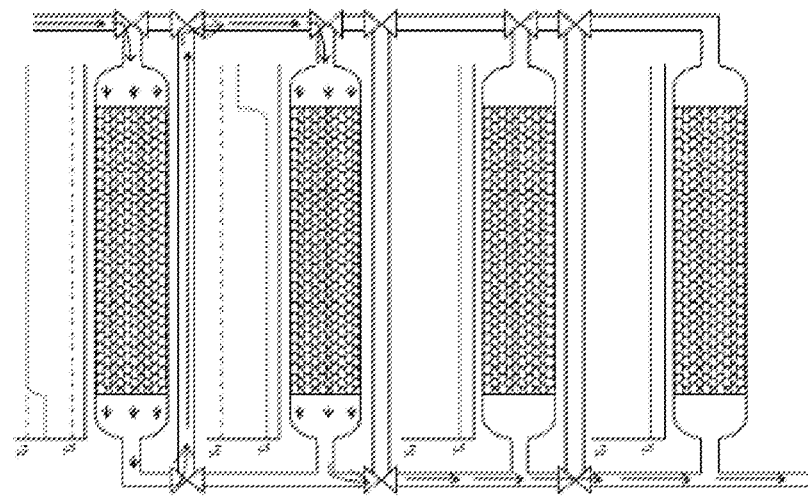
Figure 2D:
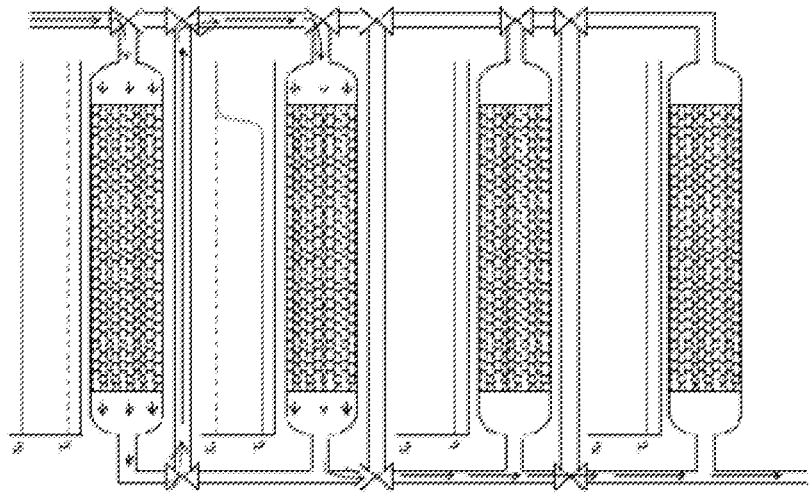
Figure 3:
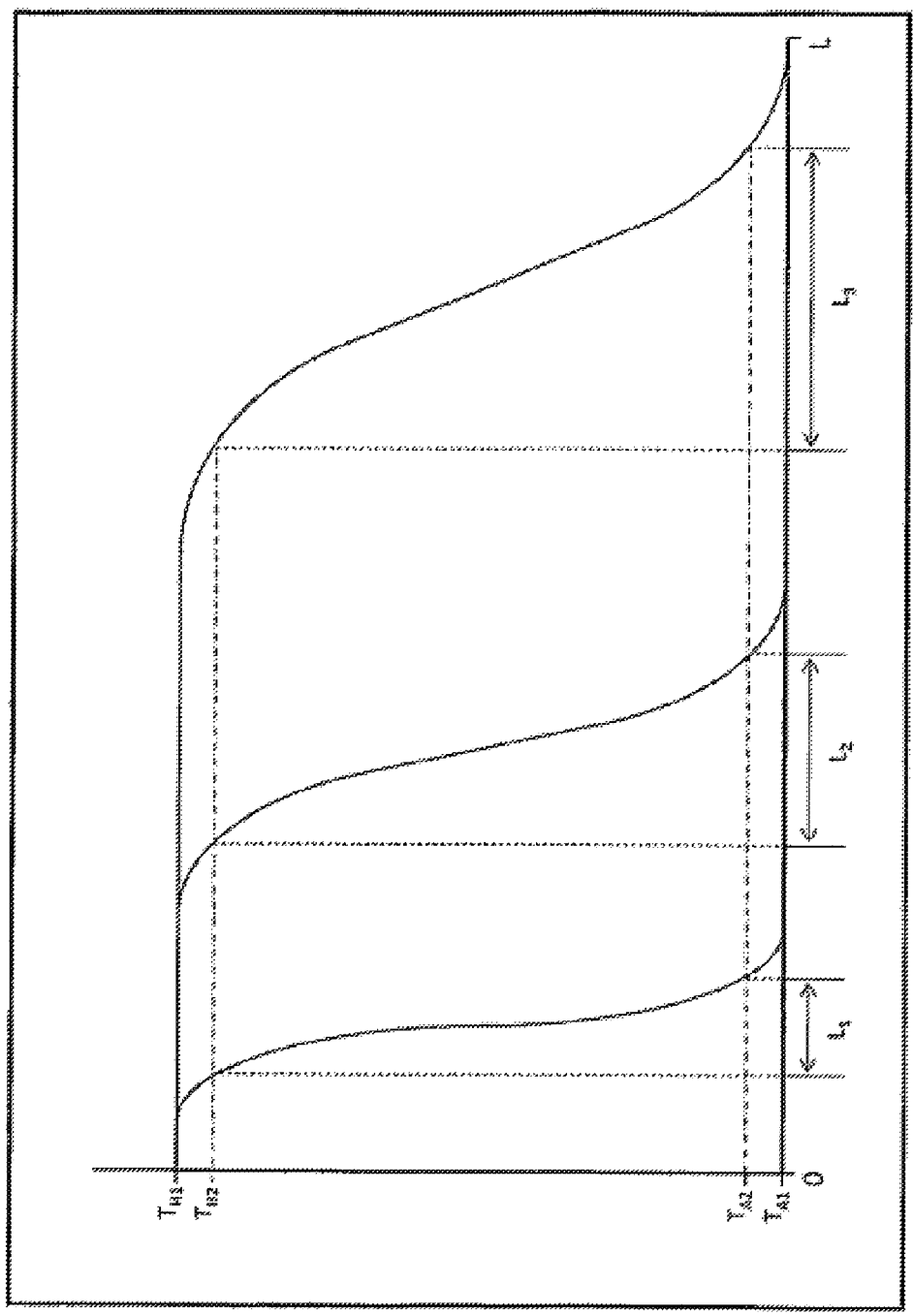

When the temperature in the gas exiting at inlet/outlet 471 has risen to a certain preset level the flow is directed via valve 457 and valve 452 so that it now enters storage vessel 402 via inlet/outlet 462. In this way the majority of the thermal front is transferred from the end of the storage media 431 in storage vessel 401 to the storage media 431 at the start of storage vessel 402. FIG. 2c shows the front being transferred from storage vessel 401 to storage vessel 402. In FIG. 2c it can be seen that the thermal front crosses from the plenum spaces 491 to the plenum space 481. While crossing the plenums there is no opportunity for the gas to cool so the temperature is generally constant across this region, which is shown by the straight line on the graph. FIG. 2d shows the front having been fully transferred. As has been mentioned previously, this is never the whole front, but within certain bands (e.g. see FIG. 3) it may be regarded as the main section of the thermal front and this is the section that is 'fully transferred'.

Figure 2E:
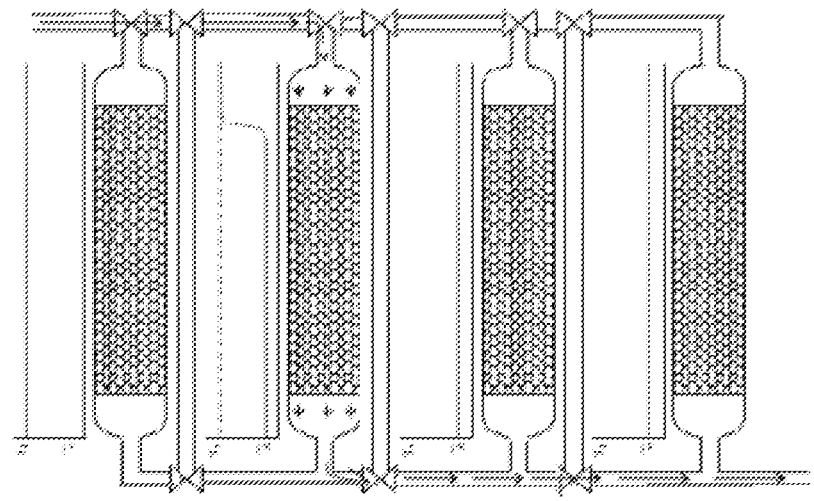

In FIG. 2e the front has been fully transferred and storage vessel 401 can be regarded as fully charged then valve 451 is switched so that the gas flow now bypasses storage vessel 401. A control logic for this switching event would, for example, be when the gas temperature in plenum 491 had risen to a certain temperature (if charging a hot store) that was within a certain range, say 20 deg C., to that of the gas entering the system in gas inlet 460.

Figure 2F:
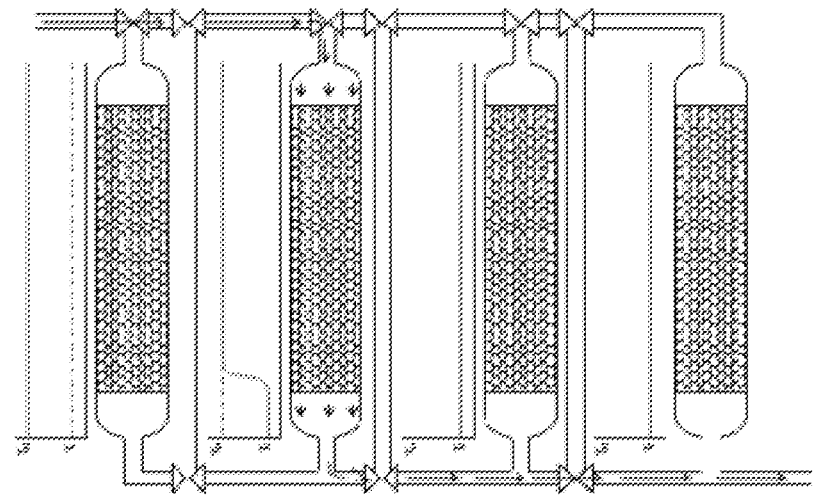

In FIG. 2f the front is approaching the end of the storage media 431 in storage vessel 402 and a similar approach to that shown in FIGS. 2b to 2e will occur where the flow switches to storage vessel 403 and then when that is full finally to storage vessel 404.

The switching in and out of different stores upstream and downstream of the thermal front may be controlled separately. The decision to pass the flow through the next store is related to the condition of the leading edge of the thermal front. The decision to stop passing gas through a store is related to the condition of the trailing edge of the thermal front. These are likely to vary as the system is charged and discharged. By way of example the decision to switch the flow through to the next store could be when the gas temperature in plenum 491 had risen to a certain temperature (if charging a hot store) that exceeded a certain range, say 50° C., of the ambient temperature to which the heat exchangers reject toie if the external ambient temperature was 20 deg C. then the switching would occur when the gas temperature had risen to 70 deg C.

Figure 2G:
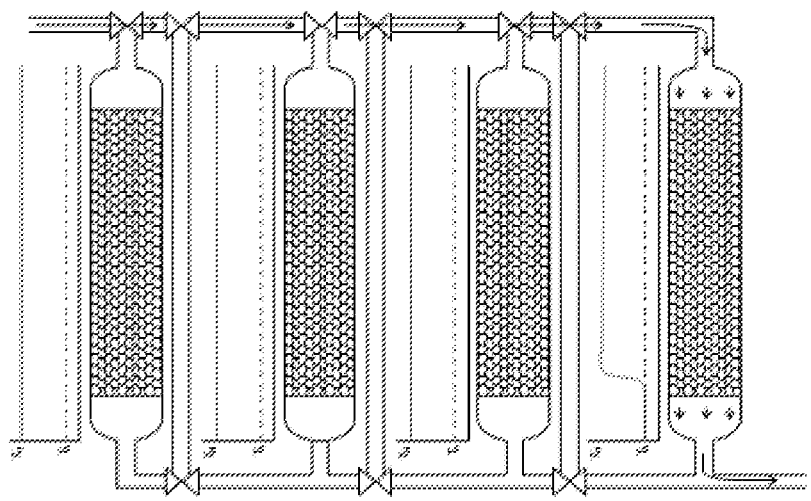
Figure 2H:
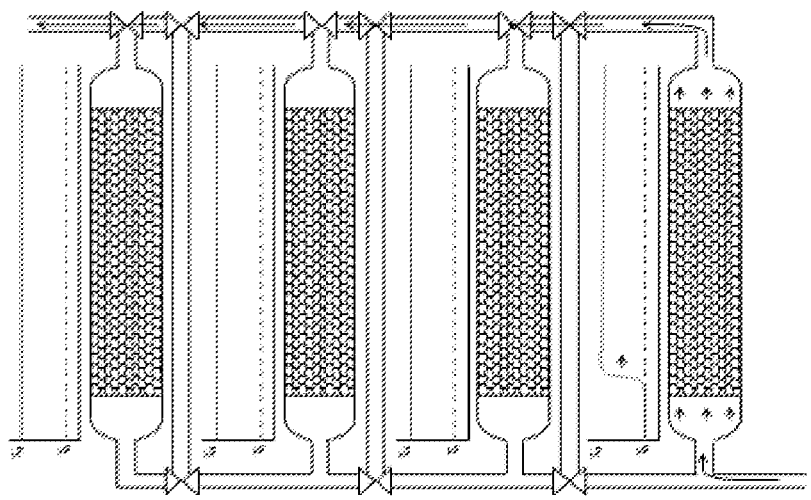
Figure 2I:
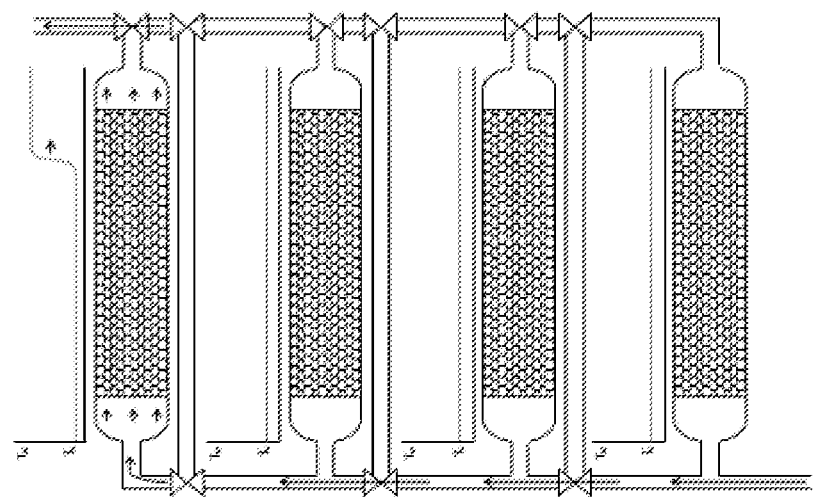

FIG. 2g shows the system fully charged. FIG. 2h shows the system starting to discharge and FIG. 2i shows the system in a discharged state, where part of the front has been left within the storage media 431 in storage vessel 401. In this way when the charging process restarts it is not necessary to create this thermal front from just ambient temperature storage media.

The discharging mode will now be described in more detail. Since for discharging, the flow is reversed, system outlet 470 now becomes the system inlet which admits cold gas to the (hot) storage system and to store 404 initially. The media is cooled by the cold gas and the active transfer region starts to move towards the downstream end of store 404 (FIG. 2h).

Control logic for controlling the leading edge of the thermal front, i.e. the downstream end of the active transfer region (i.e. furthest from system inlet 470), namely, switching through from store 404 to the next store 403 might be, for example, that when a sensor in plenum 481 registers that the gas has managed to cool down a certain amount from the (hot) start temperature (as still present downstream in the rest of the stores downstream), for example, by 20° C., then the flow path (which had been going directly to system outlet 460 (see FIG. 2h) is instead diverted into store 403 inlet 473. For a period of time, flow then passes through both stores 404 and 403 and thermal transfer is active in both stores.

Control logic for controlling the trailing edge of the thermal front, i.e. the upstream end of the active transfer region (i.e. nearest system inlet 470) as it approaches the end of store 404 so as to switch out store 404 completely, by letting the flow divert so that it goes directly from system inlet 470 to store 403 inlet 473, might be, for example, to do this when the temperature in plenum 481 is nearly as cool as (for example, only 10° C. warmer than) the (cold) inlet temperature (now present upstream of the active thermal transfer region).

Heat exchange to remove low level warming of the gas may occur continuously at heat exchanger 486, where the aim is to ensure that the gas leaves at a temperature that is near a set datum. As has been explained, a simple control logic may be used that switches between stores when a certain preset rise in temperature is detected in the gas entering heat exchanger 486 or one of the inlet/outlets 470,471,472,473,474. This has the effect of truncating the thermal front at the end that is closest to ambient.

Each of the thermal stores 401,402,403 and 404 may have different types and/or sizes of media or different arrangements of media i.e. the void space may vary between stores. In this way the stores may be adapted for different applications, such as efficient charging in series or fast charging in parallel, if required.

It will be noted that in this particular multi-store system the stores are connected both in series and in parallel. (There are possible parallel arrangements where the stores are not connected in series, and possible series arrangements where the stores would not be connected in parallel.) This is a simple way of achieving the necessary bypass connections but would also allow the system to be alternatively used for more rapid charging with all the stores being used simultaneously.

Furthermore it may well be that the flow follows a combination of serial and parallel paths, for example the flow could pass through a first store into a multiple arrangement of parallel stores. In this way it is possible to charge multiple stores in parallel while only using one thermal front, that is effectively provided by, in this case, the first store. When the first store is fully charged and the parallel stores are being charged it can be switched out of the flow. When discharging the flow path can be reversed so that all of the thermal fronts end up within the first store. The pressure loss through the first store is likely to be greater than that created by the parallel stores if the media and stores are the same, but this pressure loss will only occur for a limited period and the improved efficiency from not creating multiple thermal fronts in each store may generate a higher system efficiency when used as part of an electricity storage system.

The heat storage system may form part of an electricity storage system, in particular, a pumped heat electricity storage system or compressed air energy storage system.

The pumped heat electricity storage system may comprise a first stage comprising: a compressor; and
a first heat storage system according to the invention for receiving and storing thermal energy from gas compressed by the compressor; and
a second stage comprising: an expander for receiving gas from the first heat store; and a second heat storage system according to the invention for transferring thermal energy to gas expanded by the expander;
the system comprising a circuit configured to allow gas to pass cyclically between the first and second stages during at least one of a charging phase and a discharging phase.

Figure 4:
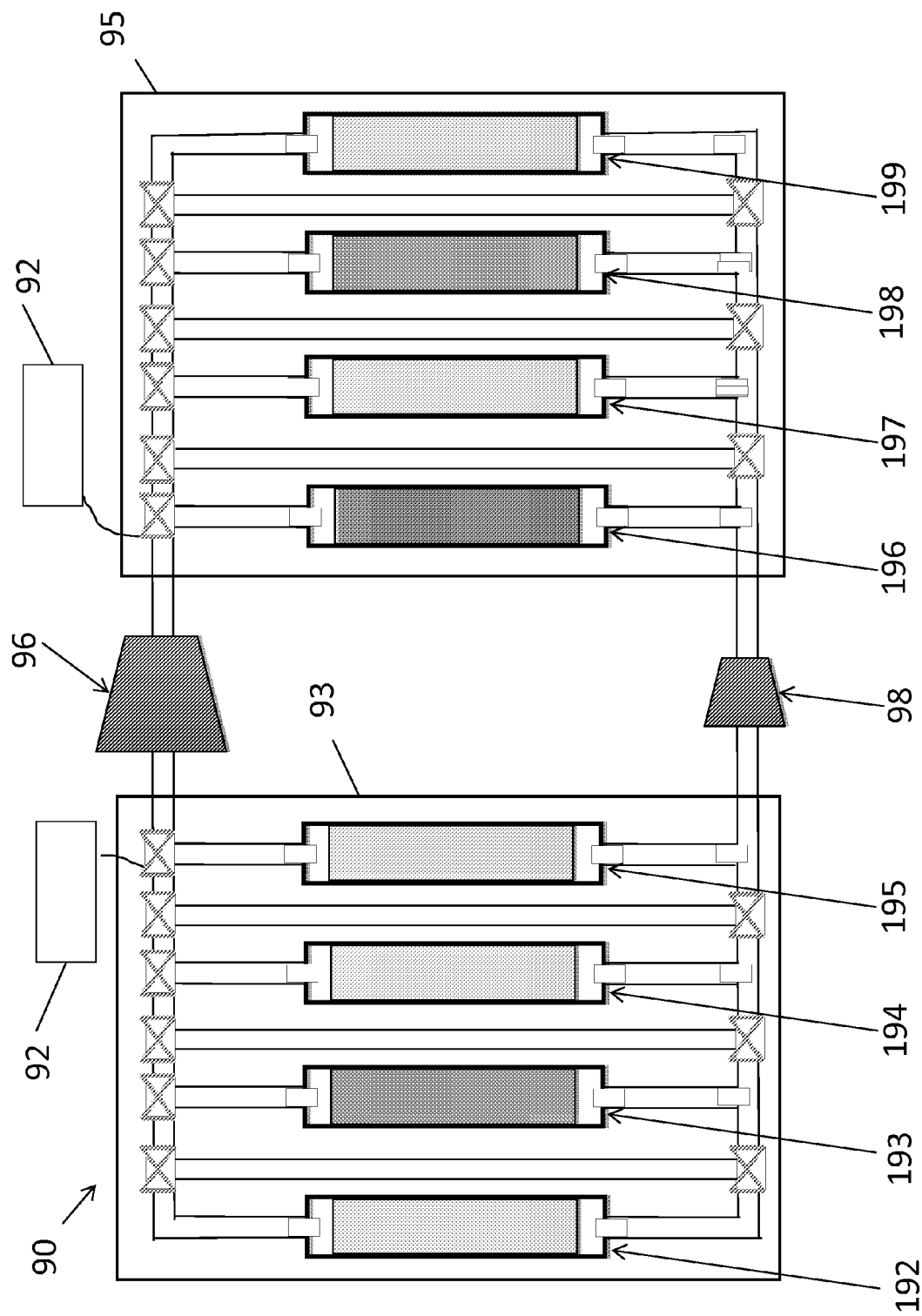

An example of a reversible system 90 in which two heat storage systems 93 and 95 according to the invention may be used is illustrated schematically in FIG. 4.

The system is a pumped heat storage system, as described in Applicant's earlier patent application WO 2009/044139, and is a reversible system operable in a charging mode to store electrical energy as thermal energy, and operable in a discharging mode to generate electrical energy from the stored thermal energy. The system comprises respective positive displacement devices acting as compressor 96 and expander 98, respectively, as well as the heat storage system 95 formed of high pressure (hot) stores 196,197,198,199 and the heat storage system 93 formed of lower pressure (cold) stores 192,193,194,195.

Each heat storage system 93, 95 will usually include a control system 92 for controlling the operation of the flow controllers (e.g. the bypass valves) and these may be linked to sensors provided in each system 93, 95, as described above.

Store 198 is of a different type to the other stores 196,197,198 in the system 95, i.e. it has different storage characteristics, for example, it may be made of a different type of storage media material and may be used, for example, only in certain situations; the same applies to store 193 in the other system 93.

During the charging phase, one device 96 compresses low pressure gas and the pressurised gas then passes sequentially through the system 95 of high pressure stores 196, 197, 198 and 199, as has previously been described, where it loses its heat before being re-expanded in the other device 98 and passing at a lower pressure through the system 93 of lower pressure stores 192,193,194 and 195 where it gains heat, again in a sequential manner as has previously been described, and returns to the start of the circuit at its original temperature and pressure.

In discharge mode, the positive displacement devices and the hot and cold stores of the respective systems are required to reverse their functions, so that for example, the charged hot stores have cooler gas re-entering at the cool inlets (which were previously the outlets).

The reversible system may conduct a full charging cycle or a full discharging cycle, or may reverse its function at any point of charging or discharging; for example, if electricity is required by the national grid a charging cycle may be interrupted and the stored thermal energy converted to electrical energy by allowing the system to start to discharge. The system may also need to remain in a charged, uncharged or part charged state for periods of time.

In this reversible system, the gas may be air or an inert gas such as nitrogen or argon. By way of example, the hot stores may operate at a gas pressure of about 12 bar with Argon and a temperature range of 0 to 500° C., and the cold stores may operate at near atmospheric pressure and a temperature range of 0 to −160° C.

It will be appreciated that the improved heat storage system incorporating a packed bed or porous media for heat transfer from a gas to a solid, where different stores are used in turn to create an improved thermal storage system, may have better heat transfer and/or reduced overall pressure drop.

The invention claimed is:

1. A heat storage system comprising a system gas inlet, a system gas outlet, and three or more thermal stores connected together in series between the system gas inlet and the system gas outlet, wherein each store comprises a chamber having a gas inlet, a gas outlet, and a gas-permeable thermal storage media disposed therebetween,
the system further comprising flow controllers operatively connected to bypass passageways and so configured that, during operation, a flow path of a gas flowing through the system and the storage media for transfer of thermal energy to or from the storage media is selectively altered in respect of which stores in the series are used in response to the progress of a thermal front through the storage media, and
wherein each store outlet apart from the last store outlet in the series is selectively connectable either to the system outlet or to the inlet of the next store in the series, and wherein the system is configured so that the gas flow path keeps being altered so as to bypass all stores in the series downstream of the store containing a leading edge of the thermal front.

2. A heat storage system according to claim 1, wherein each store inlet apart from the last store inlet in the series is selectively connectable to the inlet of the next store in the series.

3. A heat storage system according to claim 1, wherein the system is configured such that, in operation, the gas flow is capable of being stopped from passing through a store dependent upon the progress of a trailing edge of the thermal front.

4. A heat storage system according to claim 1, wherein:
The system is configured for first redirection such that, in operation, the gas flow is capable of being directed to the next store in the series dependent upon the progress of a leading edge of the thermal front;
The system is configured for second redirection such that, in operation, the gas flow is capable of being stopped from passing through a store dependent upon the progress of the trailing edge of the thermal front; and
The first redirection and the second redirection of the gas flow are independent of one another.

5. A heat storage system according to claim 1, wherein the three or more thermal stores are connected both in series and in parallel.

6. A heat storage system according to claim 1, wherein the stores in the series are of at least two different types.

7. A heat storage system according to claim 1, further comprising a control system for selectively altering the gas flow path that comprises control logic for controlling a leading edge of the thermal front and/or a trailing edge of the thermal front, the control system configured to switch the gas flow path between stores when a certain preset rise or fall in temperature is detected.

8. A heat storage system according to claim 1, wherein the gas-permeable thermal storage media in at least one store in the series is particulate with a mean particle size of 20 mm or less.

9. A heat storage system according to claim 1, wherein the system is configured so that the gas flow path keeps being altered so as to bypass all stores in the series upstream of the store containing a trailing edge of the thermal front.

10. A heat storage system according to claim 1, wherein the system is configured such that, in operation, the gas flow is directed to the next store in the series dependent upon the progress of the leading edge of the thermal front, the gas flow being directed to the next store in the series when a gas exit temperature at the respective store gas outlet, or at the system gas outlet, has risen or fallen to a certain preset level.

11. A heat storage system according to claim 1, wherein the gas-permeable thermal storage media comprises a porous or particulate solid.

12. A method of operating a heat storage system comprising a system gas inlet, a system gas outlet, and three or more thermal stores connected together in series between the system gas inlet and the system gas outlet, wherein each store comprises a chamber having a gas inlet, a gas outlet, and a gas-permeable thermal storage media disposed therebetween, the system further comprising flow controllers operatively connected to bypass passageways, the method comprising:
passing gas from the system gas inlet to the system gas outlet through the thermal storage media for transfer of thermal energy to or from the storage media, and selectively altering the gas flow path in respect of which stores in the series are used in response to the progress of a thermal front through the storage media,
wherein each store outlet apart from the last store outlet in the series is selectively connectable either to the system outlet or to the inlet of the next store in the series, and wherein the gas flow path keeps being altered so as to bypass all stores in the series downstream of the store containing a leading edge of the thermal front.

13. A method according to claim 12, wherein the three or more thermal stores are connected both in series and in parallel, and wherein during the course of a charging phase, or during the course of a discharging phase, stores are used in series and in parallel.

14. Electricity storage system comprising a heat storage system according to claim 1.

15. A method according to claim 12, wherein the gas flow is stopped from passing through a store depending upon the progress of a trailing edge of the thermal front.

16. A method according to claim 12, wherein the gas-permeable thermal storage media comprises a porous or particulate solid.

* * * * *